US010654381B2

(12) United States Patent
Lorey et al.

(10) Patent No.: US 10,654,381 B2
(45) Date of Patent: May 19, 2020

(54) VEHICLE SEAT COMPRISING ADJUSTABLE DAMPER

(71) Applicant: GRAMMER AG, Amberg (DE)

(72) Inventors: Konstantin Lorey, Schmidgaden (DE); Konstantin Krivenkov, Amberg (DE)

(73) Assignee: GRAMMER AG, Amberg (DE)

(*) Notice: Subject to any disclaimer, the term of this patent is extended or adjusted under 35 U.S.C. 154(b) by 5 days.

(21) Appl. No.: 16/031,052

(22) Filed: Jul. 10, 2018

(65) Prior Publication Data

US 2019/0009697 A1   Jan. 10, 2019

(30) Foreign Application Priority Data

Jul. 10, 2017 (DE) .................. 10 2017 115 347

(51) Int. Cl.
| | |
|---|---|
| *B60N 2/16* | (2006.01) |
| *B60N 2/52* | (2006.01) |
| *B60N 2/50* | (2006.01) |

(52) U.S. Cl.
CPC ............. *B60N 2/522* (2013.01); *B60N 2/502* (2013.01); *B60N 2/508* (2013.01); *B60N 2/525* (2013.01); *B60N 2/16* (2013.01)

(58) Field of Classification Search
CPC ........ B60N 2/522; B60N 2/525; B60N 2/502; B60N 2/16; B60N 2/508
USPC ........................................ 297/344.12, 216.17
See application file for complete search history.

(56) References Cited

U.S. PATENT DOCUMENTS

| | | | | |
|---|---|---|---|---|
| 3,823,932 A | * | 7/1974 | Simons .................. | B60N 2/502 267/133 |
| 4,448,386 A | * | 5/1984 | Moorhouse ............ | B60N 2/502 248/564 |
| 5,169,112 A | * | 12/1992 | Boyles .................. | B60N 2/501 248/550 |

(Continued)

FOREIGN PATENT DOCUMENTS

| | | |
|---|---|---|
| DE | 102008023563 | 10/2009 |
| DE | 102009041811 | 4/2011 |

(Continued)

OTHER PUBLICATIONS

Official Action for German Patent Application No. 102017115347.0, dated Mar. 7, 2018, 3 pages.

(Continued)

*Primary Examiner* — Syed A Islam
(74) *Attorney, Agent, or Firm* — Sheridan Ross P.C.

(57) ABSTRACT

Vehicle seat comprising an upper seat part and a lower seat part, the upper seat part and the lower seat part being connected by a scissor-action frame, and comprising a damper, the scissor-action frame comprising a first scissor arm and a second scissor arm, the first scissor arm and the second scissor arm being mounted so as to be rotatable about a common swivel axis, a first end of the damper being rotatably connected to the first scissor arm, a first lever element and a second lever element being provided, a first end of the first lever element being rotatably connected to the first scissor arm and a first end of the second lever element being rotatably connected to the second scissor arm and a second end of the damper being rotatably connected to a second end of the first lever element and to a second end of the second lever element.

17 Claims, 9 Drawing Sheets

(56) References Cited

U.S. PATENT DOCUMENTS

| | | | | |
|---|---|---|---|---|
| 5,222,709 | A * | 6/1993 | Culley, Jr. | B60N 2/502 |
| | | | | 248/421 |
| 5,676,424 | A * | 10/1997 | Winkelhake | B60N 2/1803 |
| | | | | 248/421 |
| 5,957,426 | A * | 9/1999 | Brodersen | B60N 2/502 |
| | | | | 248/421 |
| 6,550,740 | B1 | 4/2003 | Burer | |
| 7,712,836 | B2 * | 5/2010 | Deml | B60N 2/501 |
| | | | | 297/344.12 |
| 8,894,152 | B2 * | 11/2014 | Lorey | B60N 2/502 |
| | | | | 297/344.16 |
| 9,527,416 | B2 * | 12/2016 | Brodersen | B60N 2/507 |
| 9,782,005 | B2 * | 10/2017 | Paul | A47C 1/0342 |
| 2011/0024958 | A1 * | 2/2011 | Deml | B60N 2/502 |
| | | | | 267/131 |
| 2012/0091773 | A1 * | 4/2012 | Lorey | B60N 2/502 |
| | | | | 297/344.19 |

FOREIGN PATENT DOCUMENTS

| | | |
|---|---|---|
| DE | 102010048210 | 4/2012 |
| DE | 102013021057 | 6/2017 |

OTHER PUBLICATIONS

Extended Search Report for European Patent Application No. 18181430.2, dated Nov. 21, 2018, 5 pages.

* cited by examiner

VEHICLE SEAT COMPRISING ADJUSTABLE DAMPER

CROSS-REFERENCE TO RELATED APPLICATIONS

This application claims the benefit of German Patent Application No. 10 2017 115 347.0 filed Jul. 10, 2017, the entire contents of which are incorporated herein by reference.

FIELD

The invention relates to a vehicle seat comprising an upper seat part and a lower seat part, the upper seat part and the lower seat part being connected by a scissor-action frame, and comprising a damper, the scissor-action frame comprising a first scissor arm and a second scissor arm, the first scissor arm and the second scissor arm being mounted so as to be rotatable about a common swivel axis, a first end of the damper being rotatably connected to the first scissor arm.

BACKGROUND

The displacement movement of vehicle seats of this kind, which is guided by the scissor-action frame, is damped by a damper, as a result of which vibrational loads on the vehicle driver, sitting on a vehicle seat of this kind, are reduced.

In this case, end impacts are frequently used that are intended to protect the vehicle seat against damage in the case of complete displacement, wherein end impacts of this kind considerably reduce the comfort of the vehicle seat.

Furthermore, vehicle seats are known that can react to various driving situations by adapting the damping rate; however, these seats have excessively hard damping in normal operation, which is perceived and felt to be disadvantageous for the vehicle driver, or said seats are very cost-intensive.

SUMMARY

It is therefore the object of the present invention to overcome the disadvantages of the prior art and to present a vehicle seat that has comfortable damping and effective end impact protection in normal operation.

This object is achieved according to the features of claim 1. Advantageous embodiments of the invention can be found in the dependent claims.

The basic concept of the invention is to provide a vehicle seat comprising an upper seat part and a lower seat part, the upper seat part and the lower seat part being connected by a scissor-action frame, and comprising a damper, the scissor-action frame comprising a first scissor arm and a second scissor arm, the first scissor arm and the second scissor arm being mounted so as to be rotatable about a common swivel axis, a first end of the damper being rotatably connected to the first scissor arm, a first lever element and a second lever element being provided, a first end of the first lever element being rotatably connected to the first scissor arm and a first end of the second lever element being rotatably connected to the second scissor arm and a second end of the damper being rotatably connected to a second end of the first lever element and to a second end of the second lever element.

This means in particular that, when the vehicle seat is displaced, i.e. the scissor-action frame moves, the second end of the damper, in addition to the first end of the damper, is positively guided by the first lever element and the second lever element. Positive guidance of this kind in particular makes it possible to adjust the damper force of the damper, in particular on the basis of the displacement movement of the scissor-action frame, by changing the distance between the first end of the damper and the second end of the damper, which distance is a result of the positive guidance of the second end of the damper.

It is therefore in particular possible to significantly change the damper force in the range of the end impacts, i.e. a maximum displacement of the vehicle seat, compared with the normal driving operation. In normal driving operation, a soft damper setting is preferred, whereas in the range of the end impacts, a hard damper setting is preferred, precisely in order to be able to avoid an actual end impact.

The vehicle seat can be used for land vehicles, commercial vehicles, agricultural vehicles, construction site vehicles, other lorries and passenger cars and for boats and ships.

According to a preferred embodiment, the first end of the first lever element is rotatably connected to the first scissor arm by means of a first swivel axis and the first end of the second lever element is connected to the second scissor arm by means of a second swivel axis and the second end of the first lever element, the second end of the second lever element and the second end of the damper are connected by means of a third swivel axis.

In particular, the first end of the first lever element is rotatably connected directly to the first scissor arm by means of the first swivel axis and the first end of the second lever element is rotatably connected directly to the second scissor arm by means of the second swivel axis. In this case, "directly" means that no additional components or parts are provided for connection.

In particular, the first swivel axis, the second swivel axis and the third swivel axis are arranged in pairs so as to be mutually parallel. In particular, the first, second and third swivel axis and the common swivel axis extend in a vehicle seat width direction of the vehicle seat.

According to another preferred embodiment, in a first state in which the vehicle seat is completely compressed, a first connection line between the first swivel axis and the third swivel axis and a second connection line between the second swivel axis and the third swivel axis form an acute angle, the acute angle preferably being between 5° and 45°, and the angle preferably being smaller than 10°, more preferably smaller than 5° and particularly preferably smaller than 3°.

In this case, "completely compressed" means that a distance between the upper seat part and the lower seat part is minimal, i.e. the scissor-action frame is maximally collapsed. Alternatively, "maximally compressed" may be used instead of "completely compressed".

A design of this kind is expedient in order to avoid dead centres that may occur in the movement of the first lever element, the second lever element and, accordingly, the second end of the damper.

Correspondingly, it is also the case for another preferred embodiment that, in a second state in which the vehicle seat is completely extended, a first connection line between the first swivel axis and the third swivel axis and a second connection line between the second swivel axis and the third swivel axis form either an obtuse angle, the angle being preferably larger than 170° and more preferably larger than 175°, or an angle of 180°.

In this case, it is conceivable that the angle may be 180°, as there can be no dead centre, due to the gravitational force, and therefore it is possible for the upper seat part to move relative to the lower seat part.

According to another preferred embodiment, the first lever element is U-shaped when viewed in at least one direction that is perpendicular to the first swivel axis and comprises a first leg and a second leg, the first leg being rotatably connected to the first lever element and the second leg being rotatably connected to the third swivel axis.

In particular, the first leg and the second leg extend in the direction of the connection line of the first swivel axis and the third swivel axis. The direction that is perpendicular to the first swivel axis can in particular be perpendicular to the connection line.

Also preferably, the second leg extends further in the direction of the connection line than the first leg.

According to a preferred embodiment, the second lever element is plate-like.

According to a particularly preferred embodiment, the second end of the second lever element is arranged between the first leg and the second leg when viewed in the direction of longitudinal extension of the third swivel axis.

This means that, in particular if the first lever element is U-shaped, the second lever element and the first lever element engage with one another, which can reduce the overall space required.

According to a preferred embodiment, the scissor-action frame is designed such that the first scissor arm and the second scissor arm each comprise a floating bearing and a fixed bearing, the fixed bearing of the first scissor arm being connected to the upper seat part and the fixed bearing of the second scissor arm being connected to the lower seat part.

In particular, the first end of the damper is connected to the floating bearing of the first scissor arm. This means that, when the scissor-action frame is displaced, the first end of the damper correspondingly follows the movement of the first scissor arm.

According to another preferred embodiment, a distance between the first swivel axis and the common swivel axis is smaller than a distance between the first swivel axis and the floating bearing of the first scissor arm, and a distance between the second swivel axis and the common swivel axis is smaller than a distance between the second swivel axis and the floating bearing of the second scissor arm.

This saves additional installation space, and reducing the dimensions of the lever elements can save material costs and weight.

Furthermore, the distance between the first swivel axis and the third swivel axis and the distance between the second swivel axis and the third swivel axis are substantially equal. Furthermore, it is conceivable that the distance between the first swivel axis and the common swivel axis and the distance between the second swivel axis and the common swivel axis are also substantially equal.

By changing the respective distances between the swivel axes, the damping rate can be adjusted.

In accordance with the subject matter according to the invention of the present application, the damping rate may be configured such that, in normal operation, a soft damping characteristic prevails and, when the vehicle seat is displaced in the direction of maximum displacement, the damping rate is changed by changing the second end of the damper relative to the first end of the damper.

The ratio of the change in distance between the upper seat part and the lower seat part to the change in length of the damper can also be configured by means of the proposed vehicle seat such that displacement out of or into the first state is a ratio of the change in distance between the upper seat part and the lower seat part to the change in length of the damper element of ≤1, and displacement out of or into the second state is a ratio of the change in distance between the upper seat part and the lower seat part to the change in length of the damper element of ≤1.

In the third state, i.e. in normal operation or the normal state, in which the damping path is preferably substantially equal upwards and downwards in the vehicle seat height direction, the ratio of the change in distance between the upper seat part and the lower seat part to the change in length of the damper element is >>1, i.e. extremely large, ideally infinite. This means that relatively large displacement of the vehicle seat causes merely a small change in the length of the damper. Correspondingly, the damping force changes merely negligibly or by a small amount.

It is further advantageous if the vehicle seat also comprises a pneumatic spring for cushioning the vehicle seat, the pneumatic spring being connected to the scissor-action frame and to the upper seat part or the lower seat part.

The underlying object is further achieved by a commercial vehicle comprising a vehicle seat according to any of the described embodiments.

Further advantageous embodiments can be found in the dependent claims.

BRIEF DESCRIPTION OF THE DRAWINGS

Further aims, advantages and expedient uses of the present invention can be found in the following description in conjunction with the drawings, in which.

DETAILED DESCRIPTION

Figure 1:
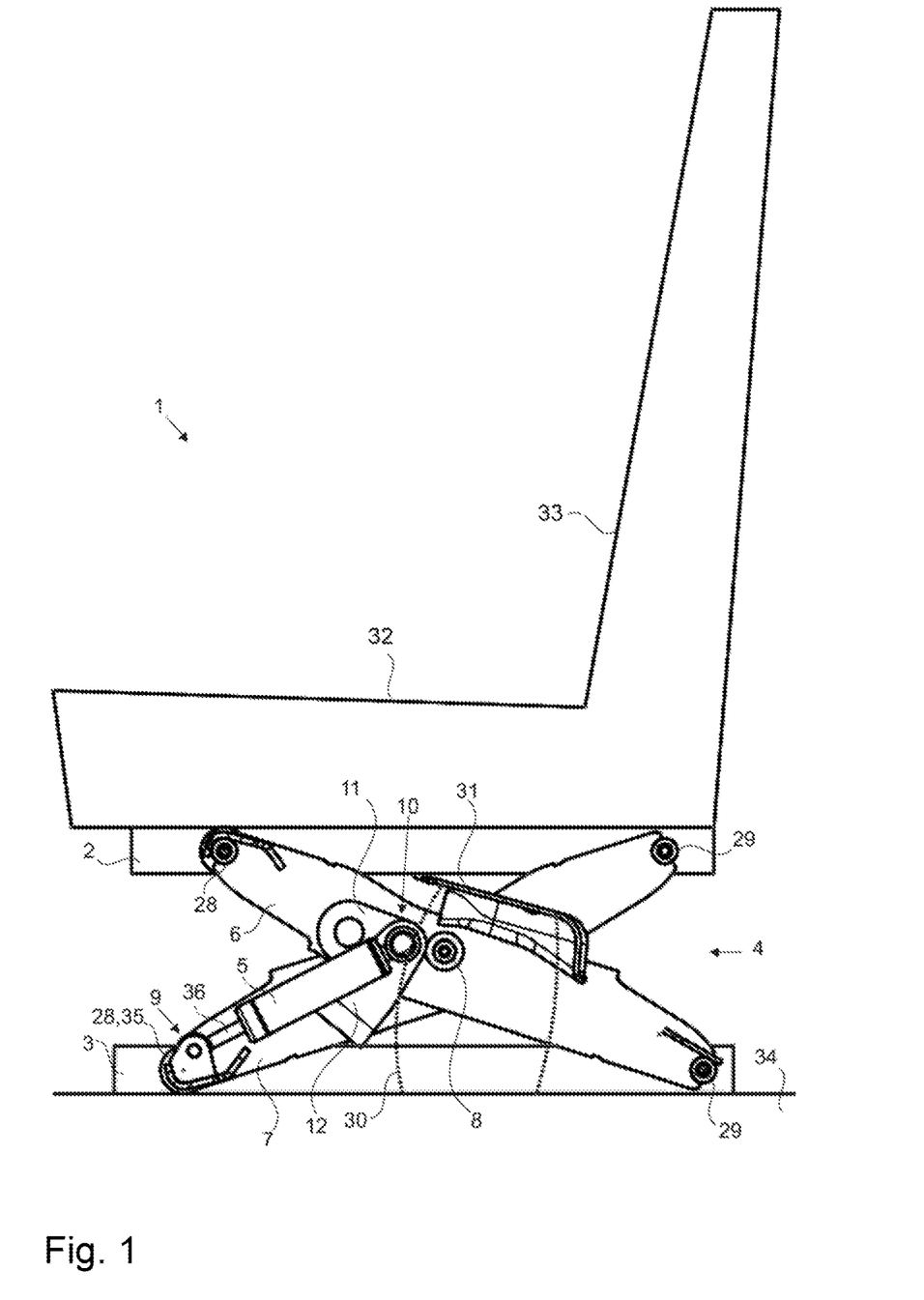
FIG. 1 shows a vehicle seat according to one embodiment.

FIG. 1 shows a vehicle seat 1 according to a particularly preferred embodiment, the vehicle seat 1 comprising an upper seat part 2 and a lower seat part 3, it being possible to arrange a seat part 32 and a backrest 33 with the upper seat part 2. The lower seat part 3, however, is preferably connected to the vehicle body floor 34 or the like.

As can be seen, the upper seat part 2 and the lower seat part 3 are also interconnected by means of a scissor-action frame 4, the scissor-action frame 4 comprising at least one first scissor arm 6 and at least one second scissor arm 7, the first scissor arm 6 and the second scissor arm 7 being rotatably connected by means of a common swivel axis 8.

In this case, the first scissor arm 6 is currently in particular rotatably connected to the upper seat part 2 by means of a fixed bearing 29, whereas the second scissor arm 7 is in particular rotatably connected to the lower seat part 3 by means of a fixed bearing 29. Furthermore, each scissor arm comprises a floating bearing 28 which is connected to the other vehicle seat part in each case; for example, for the first scissor arm 6, the floating bearing is connected to the lower seat part 3, and in particular is slidably connected thereto.

A first end 9 of the damper 5 is connected to the first scissor arm 6 and a second end 10 of the damper 5 is rotatably connected to a first lever element 11 and to a second lever element 12, and, in addition, the first lever element 11 being connected to the first scissor arm 6 and the second lever element 12 being connected to the second scissor arm 7. In particular, the first end 9 of the damper 5 is arranged in the region of the floating bearing 28, i.e. at a first end 35 of the first scissor arm 6.

When the vehicle seat 1 is displaced, which also results in displacement of the scissor-action frame 4, the second end 10 of the damper 5 is positively guided by means of the first lever element 11 and the second lever element 12. This makes it possible to vary the distance of the first end 9 of the damper 5 from the second end 10 of the damper; in particular, a piston rod 36 of the damper 5 is moved out of or into a damper housing 37 in this case.

A more accurate representation is given in the following drawings, it being possible to omit components for the sake of clarity.

Like components have like reference signs.

Figure 2A:
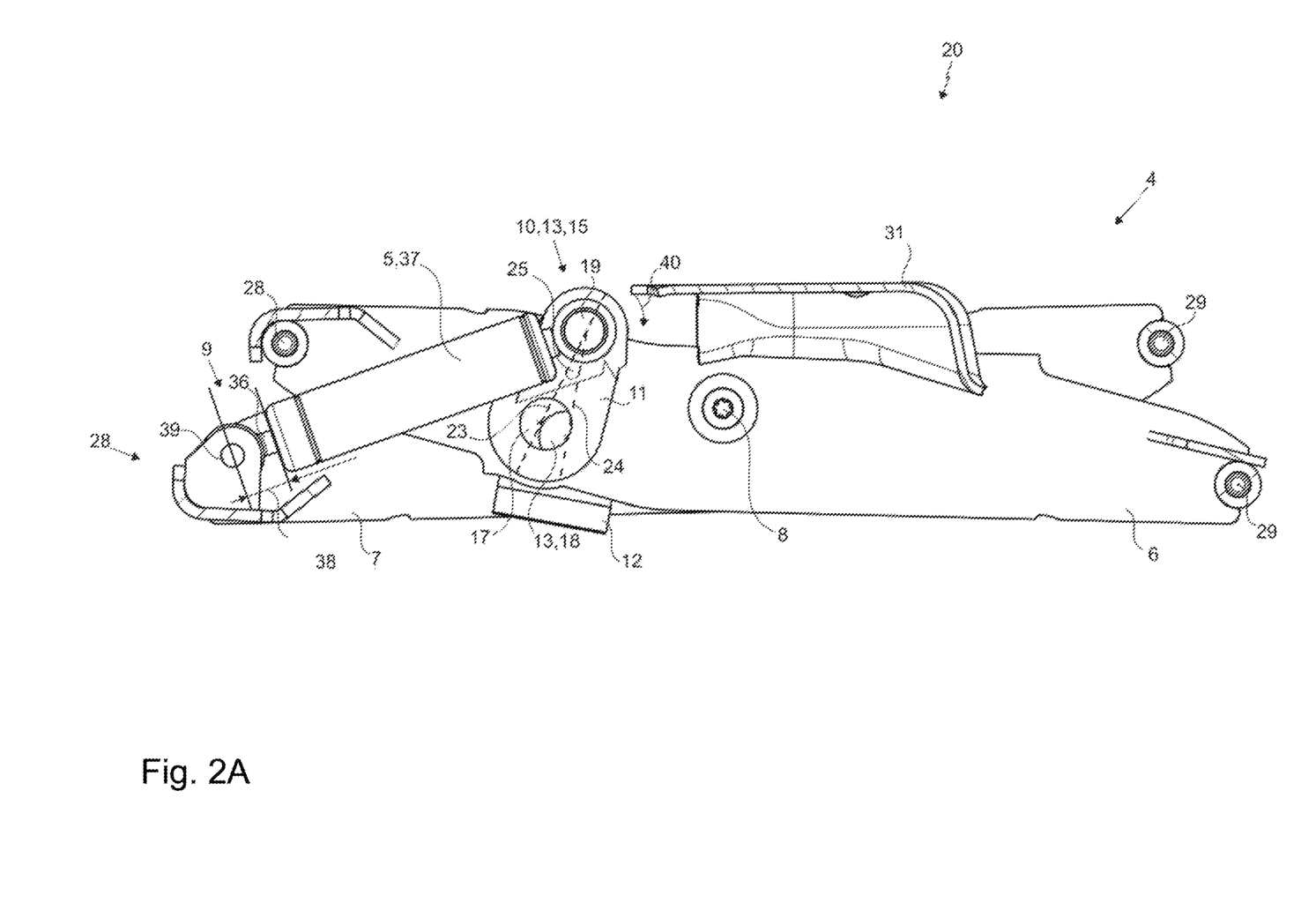
FIGS. 2A and 2B are a side view and perspective view, respectively, of a vehicle seat according to one embodiment in the compressed state.
Figure 2B:
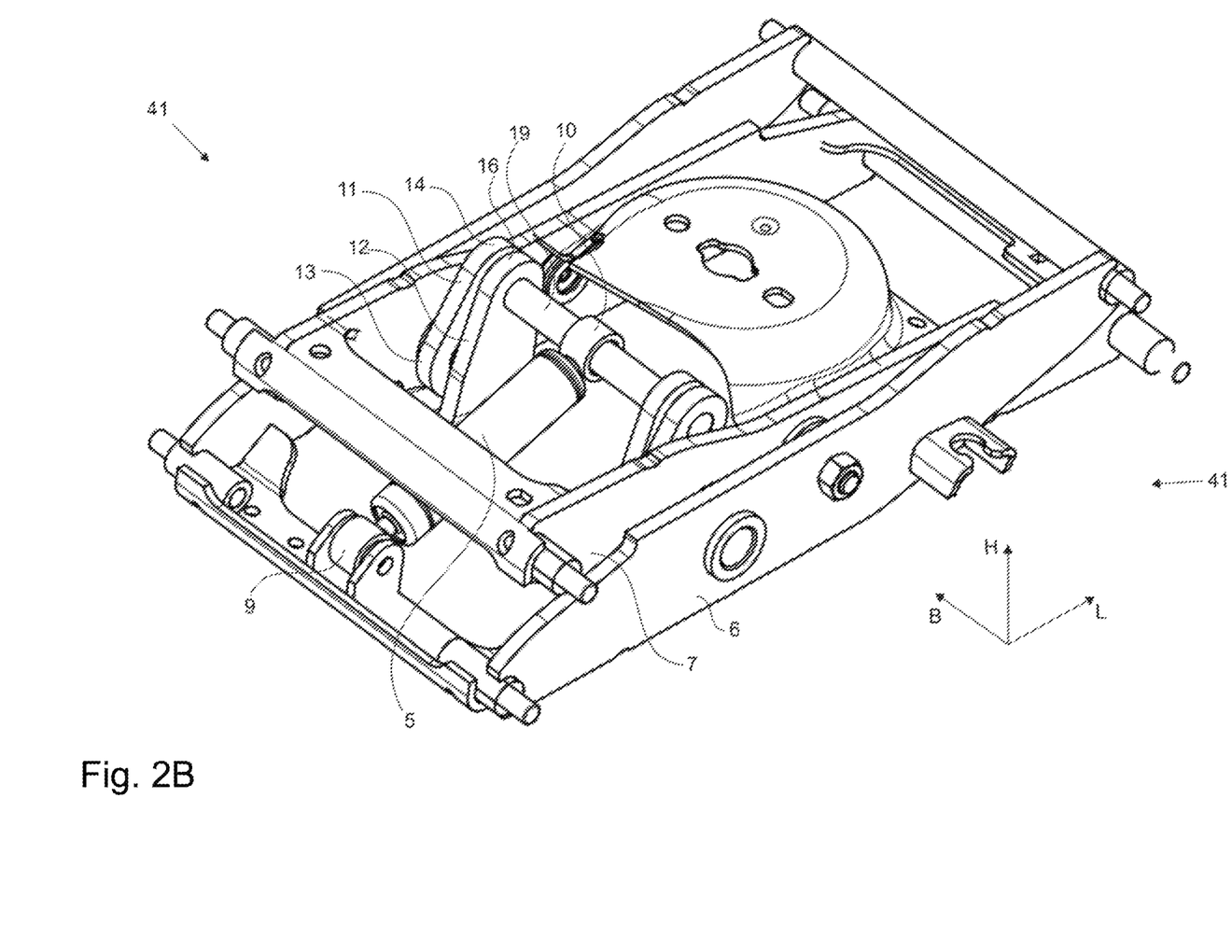
Figure 3A:
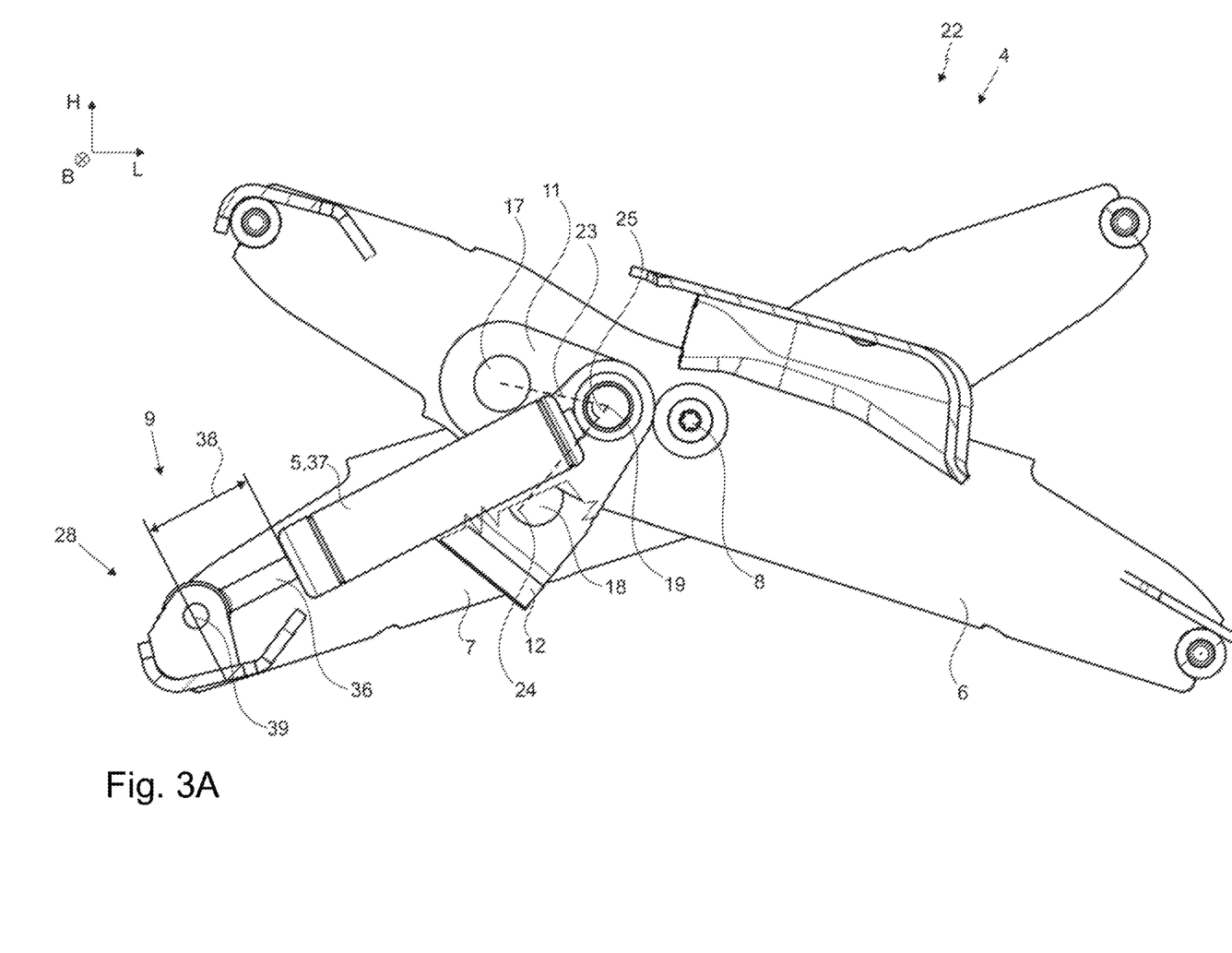
FIGS. 3A and 3B are a side view and perspective view, respectively, of a vehicle seat according to one embodiment in the intermediate state.
Figure 3B:
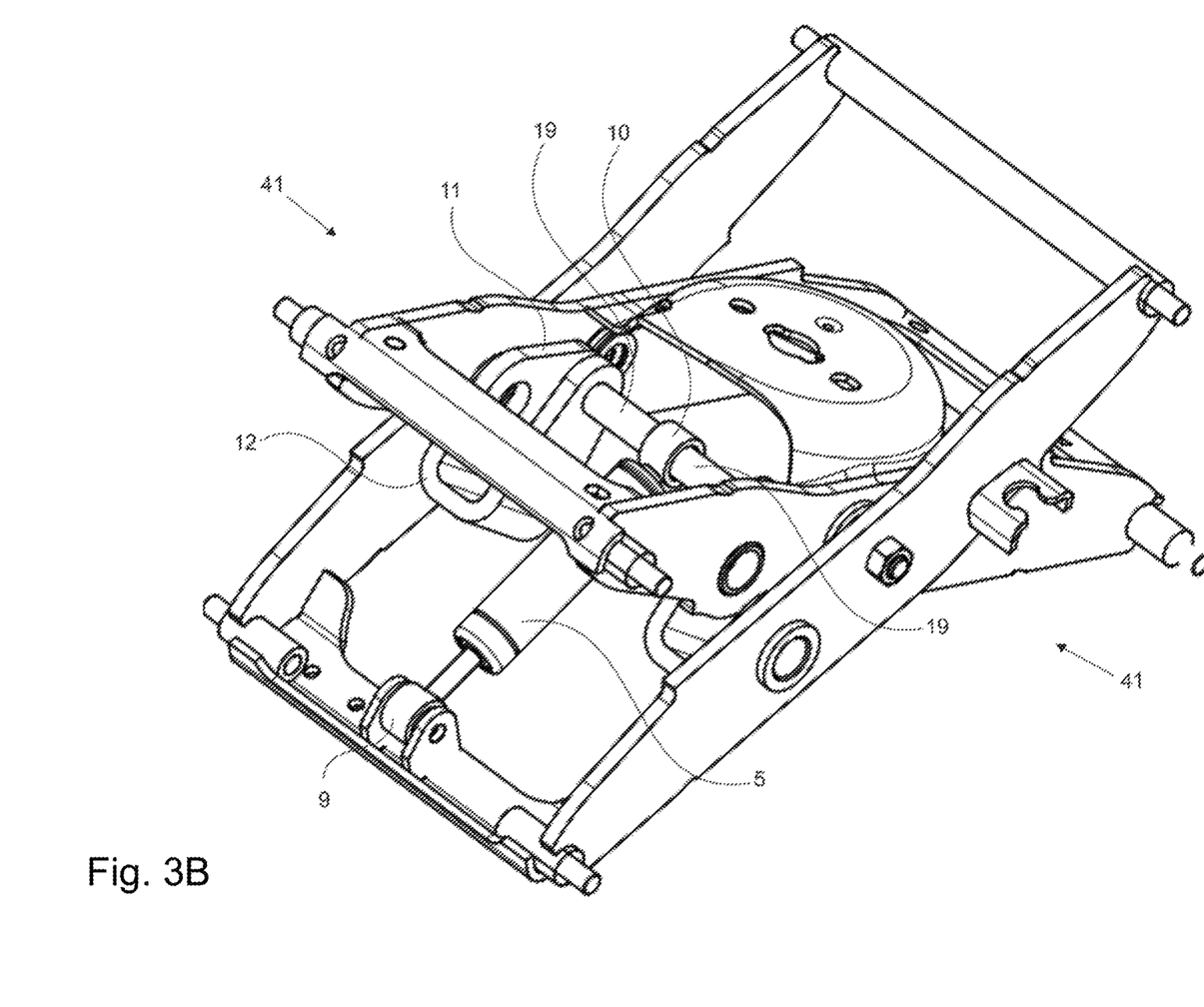
Figure 4A:
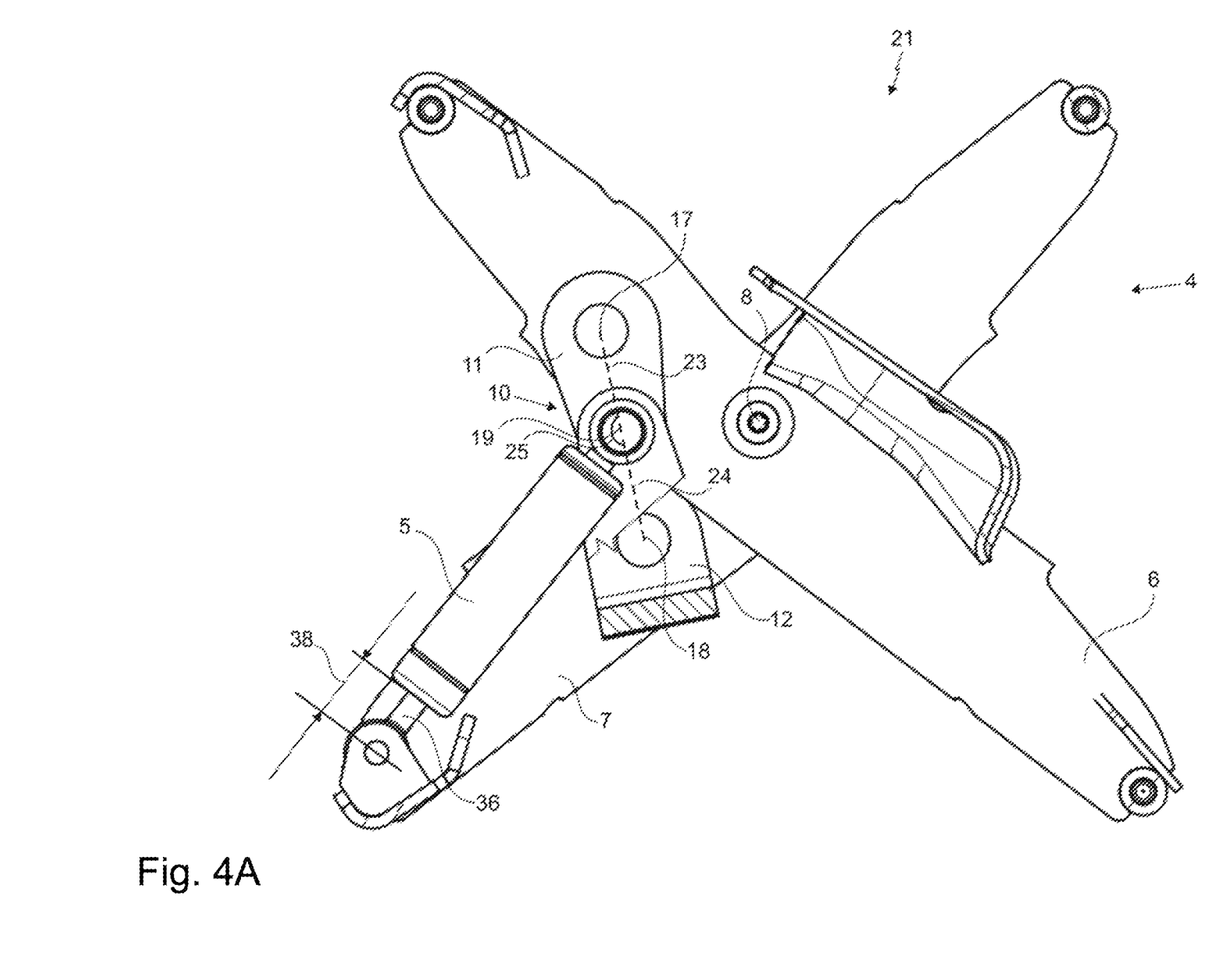
FIGS. 4A and 4B are a side view and perspective view, respectively, of a vehicle seat according to one embodiment in the extended state.
Figure 4B:
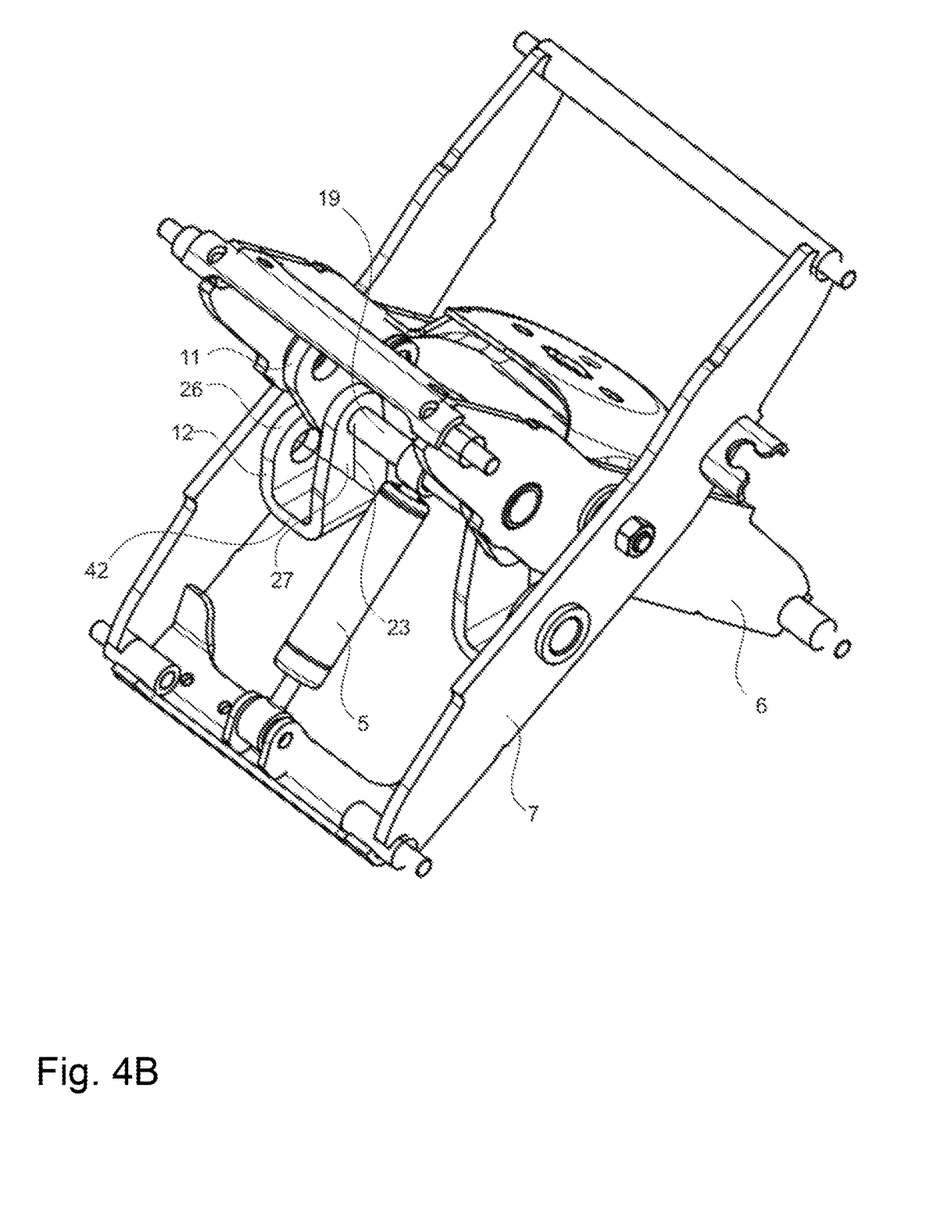

FIGS. 2A and 2B show the vehicle seat 1 in a first state 20, i.e. in a completely compressed state, FIGS. 3A and 3B show the vehicle seat 1 in a third state 22, i.e. in the normal operating state, in particular without applying force or applying only minimal force, and FIGS. 4A and 4B show the vehicle seat 1 in a second state 21, i.e. a completely extended state.

As can be seen in FIG. 2A to 4B, the first lever element 11 is rotatably connected to the first scissor arm 6 by means of a first swivel axis 17, and the second lever element 12 is rotatably connected to the second scissor arm 7 by means of a second swivel axis 18, and the second end 10 of the damper 5 is connected to the first lever element 11 and the second lever element 12 by means of a third swivel axis 19. The length 38 of the piston rod 36 is specified as the length of a fourth swivel axis 39, by means of which swivel axis the first end 9 of the damper is rotatably connected to the first scissor arm 6, as far as the damper housing 37. In particular, the lever elements 11, 12 are connected to the corresponding scissor arms 6, 7 only by means of the corresponding swivel axes 17, 18. This means that the lever elements 11, 12 are connected directly to the scissor arms 6, 7 by means of the swivel axes 17, 18.

FIGS. 2A and 2B show the vehicle seat in the first state 20, in which the scissor-action frame 4 is completely or maximally compressed. In this first state 20, the first lever element 11 and the second lever element 12 are arranged at an angle 25. In this case, the angle 25 is formed between a first connection line 23, which extends between the first swivel axis 17 and the third swivel axis 19, and a second connection line 24, which extends between the second swivel axis 18 and the third swivel axis 19. In particular, this angle is an acute angle 25 in the case of the first state 20. In particular, a distance between the first swivel axis 17 and the third swivel axis 19 is greater than a distance between the second swivel axis 18 and the third swivel axis 19, as a result of which a kind of initial condition for positively guiding the second end 10 of the damper 5 is specified. If the angle 25 were 0°, no specific direction of rotation of the second end 10 of the damper 5 would be predetermined from the outset. In this case, however, a design of this kind determines a direction of rotation of the second end 10, in the present case proceeding from the first state 20 transitioning initially into the third state 22 in the direction of the arrow 40, which indicates the direction of rotation 40. The second end 10 of the damper 5 moves towards the common swivel axis 8 through this direction of rotation 40, which is a rotation towards the right in the drawing.

FIG. 2B shows the subject matter of FIG. 2A again in perspective view. More precisely, two scissor pairs 41 are shown, each scissor pair comprising a first scissor arm 6 and a second scissor arm 7. The corresponding lever elements 11, 12 are likewise arranged on each scissor arm 6, 7. In particular, the entire device is symmetrical with regard to a plane E, which is spanned by a height direction H and a longitudinal direction L of the vehicle seat. In particular, the plane E may comprise the damper 5 in part; this means that the damper 5 is arranged such that it is symmetric with itself.

FIGS. 3A and 3B show the vehicle seat 1 in the third state 22, i.e. the vehicle seat 1 in the normal operating state. As can be seen in particular by comparing FIGS. 2A and 3A, the length 38 of the piston rod has clearly increased after the damper has carried out damping. It can further be seen from a comparison that the second end 10 of the damper 5 has been moved towards the common swivel axis 8 due to being positively guided by the first lever element 11 and the second lever element 12.

When the vehicle seat 1 is in the third state 22, the second end 10 of the damper 5 is not moved or is moved only slightly relative to the first end 9 of the damper due to the second end 10 of the damper 5 being positively guided when the vehicle seat 1 is displaced upwards or downwards, as viewed in the height direction H. This means that, proceeding from the third state in normal operation, the damper force or the damper effect of the damper 5 is not changed or is only slightly changed. This is referred to as a comfort range for the vehicle driver, in particular if a soft damping characteristic is set. However, if the vehicle seat 1 is displaced significantly upwards or downwards from the third state 22, i.e. into the first state 20 or the second state 21, in which the vehicle seat is maximally compressed or extended, respectively, the length 38 of the piston rod 36 changes significantly and, as a result, the damping also changes significantly, in particular from a soft damping characteristic to a hard damping characteristic, in order to avoid a possible end impact. In particular, the angle 25 between the first connection line 23 and the second connection line 24 may be between 45° and 80°, more preferably between 50° and 70°, and particularly preferably 60°, for the third state 22.

FIG. 3B is, similarly to FIG. 2B, a perspective view of the subject matter of FIG. 3A.

FIGS. 4A and 4B show the vehicle seat in the second state 21, in which the vehicle seat 1 is maximally displaced.

As can also be seen from comparing FIG. 4A with FIG. 3A, the length 38 of the piston rod 36 is considerably reduced again. In this case, the angle 25 between the first connection line 23 and the second connection line 24 is substantially 180°, i.e. the connection lines 23, 24 are arranged on a common line. It can further be seen that the second end 10 of the common swivel axis 8 has been moved away due to being positively guided.

In accordance with FIGS. 2B and 3B, FIG. 4B is a perspective view of the subject matter of FIG. 4A.

In particular, the more precise design of the lever elements 11, 12 can be found in FIG. 4B. In this case, the first lever element 11 is U-shaped at least in one direction that is perpendicular to the direction of extension of the third swivel axis 19 and comprises a first leg 26 and a second leg 27, the legs 26, 27 being interconnected by means of a connecting element 42. In this case, the second leg 27 extends further in the direction of the first connection line 23 than the first leg 26.

It can further be found in the drawings that the second lever element 12, in particular the second end 16 of the second lever element 12, is arranged between the first leg 26 and the second leg 27 when viewed in the direction of extension of the third swivel axis 19. The second lever element 12 may be plate-like.

Figure 5A:
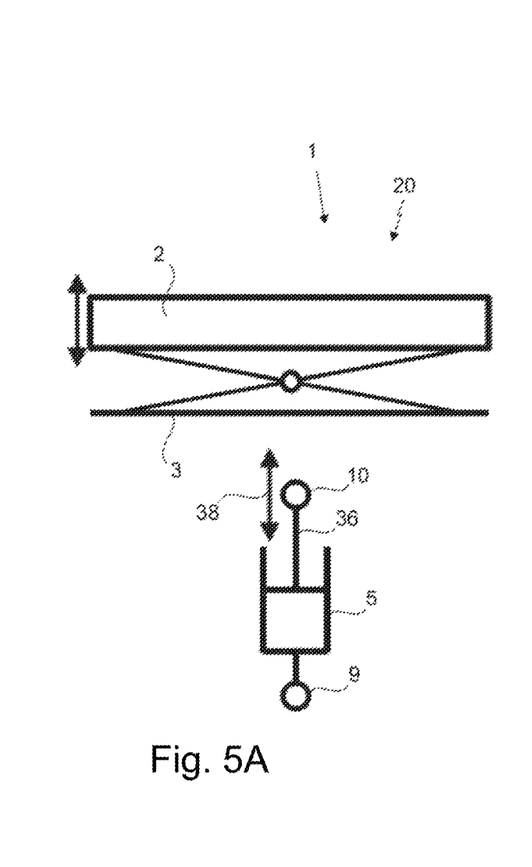
FIGS. 5A, 5B and 5C show a vehicle seat in various displacements and the corresponding damper displacements.
Figure 5B:
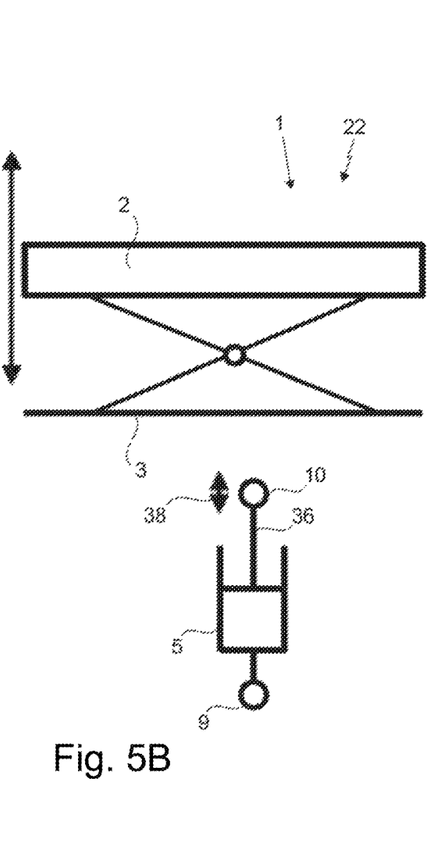
Figure 5C:
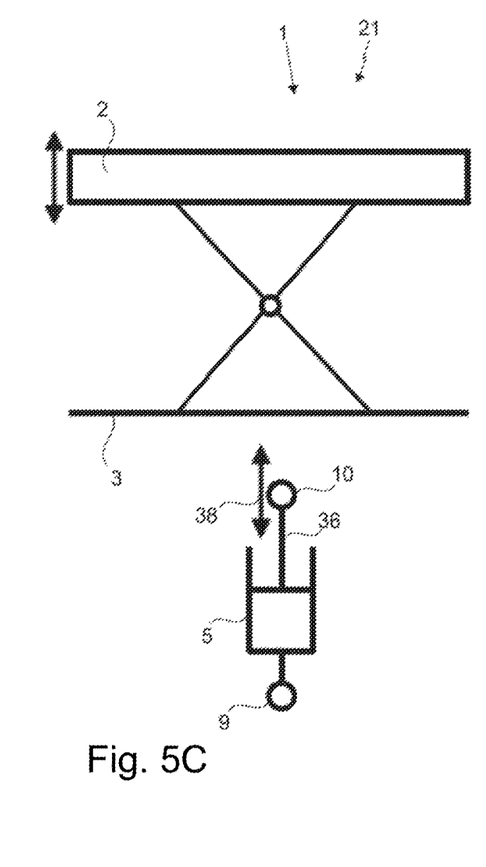

FIGS. 5A, 5B and 5C are schematic views of the different states of the vehicle seat 1, it being possible to see in particular a comparison between the displacement of the vehicle seat 1, in particular of the upper seat part 2 in relation to the lower seat part 3, and the displacement of the damper 5.

For the first state 20, as shown in FIG. 5A, the ratio of the displacement of the vehicle seat 1 to the displacement of the damper 5, in particular the change in length 38 of the piston rod 36, is less than or equal to 1 ($\leq 1$).

For the second state 21, as shown in FIG. 5C, the ratio of the displacement of the vehicle seat 1 to the displacement of the damper 5, in particular the change in length 38 of the piston rod 36, is also less than or equal to 1 ($\leq 1$).

However, for the third state 22, as shown in FIG. 5B, the ratio of the displacement of the vehicle seat 1 to the displacement of the damper 5, in particular the change in length 38 of the piston rod 36, is greater than 1, in particular much greater than 1 ($\gg 1$).

This means in particular that, when the upper seat part 3 is displaced relative to the lower seat part 3 upwards or downwards out of the third state 22 into the first state 20 or into the second state 21, the damping characteristic increases sharply due to the damper 5 being positively guided by means of the lever elements 11, 12, and the risk of an end impact is minimised.

Figure 6:
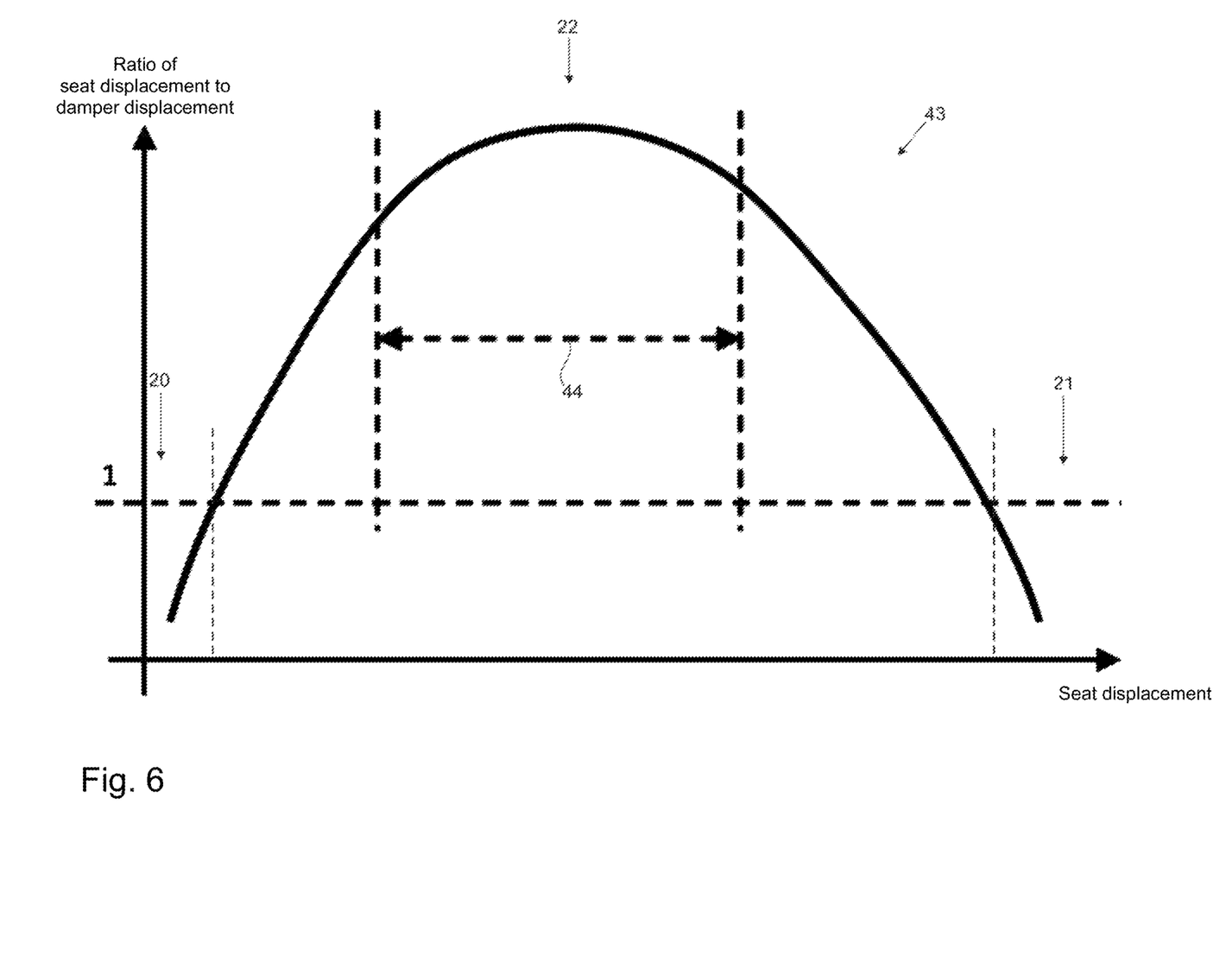
FIG. 6 is an illustration of the characteristic curve of the damper.

Such a ratio change results in a damping characteristic 43, as shown in FIG. 6.

The positive guidance of the second end 10 of the damper 5 can lead to a damping characteristic 43, as shown in FIG. 6. In particular in normal operation, the damper effect changes only negligibly, this range being specified as a comfort range 44. As mentioned above, in the comfort range, the ratio of the displacement of the vehicle seat 1 to the displacement of the damper 5, in particular the change in length 38 of the piston rod 36, is greater than 1, in particular much greater than 1 ($\gg 1$). Due to the minor displacement of the piston rod 36, the damping characteristic 43 in the comfort range 44 changes only negligibly or not at all.

The ranges of the damping characteristic 43, which have a ratio of less than or equal to 1, are to be associated with the first state 20 and the second state 21, as also already stated.

The ranges having a ratio of $\geq 1$, i.e. the ranges between the first state 20 and the third state 22 and between the third state 22 and the second state 21, relate to displacements of the vehicle seat that require increased damping, but are not yet in the critical range of the end impacts.

In summary, the damping characteristic 43 significantly increases, due to the positive guidance of the damper 5, when the upper seat part 3 is displaced significantly upwards or downwards into the first state 20 or the second state 21, such that an end impact can be prevented or at least softened. In normal operation, i.e. when the vehicle seat 1 is in a central position in the comfort range 44, the damper displacement changes slightly or not at all.

In principle, it is also conceivable to guide both damper eyes by means of a lever mechanism. In addition, the lever elements 11 and 12 may be fastened not only to the swing arms 6, 7. There may also be the combination of the upper seat part/swing arm or lower seat part/swing arm.

All the features disclosed in the application documents are claimed as being essential to the invention, provided that, individually or in combination, they are novel over the prior art.

LIST OF REFERENCE SIGNS 1 vehicle seat
2 upper seat part
3 lower seat part
4 scissor-action frame
5 damper
6 first scissor arm
7 second scissor arm
8 common swivel axis
9 first end of damper
10 second end of damper
11 first lever element
12 second lever element
13 first end of first lever element
14 second end of first lever element
15 first end of second lever element
16 second end of second lever element
17 first swivel axis
18 second swivel axis
19 third swivel axis
20 first state
21 second state
22 third state
23 first connection line
24 second connection line
25 angle
26 first leg
27 second leg
28 floating bearing
29 fixed bearing
30 pneumatic spring
31 pneumatic spring mount
32 seat part
33 backrest
34 vehicle body floor
35 first end of first scissor arm
36 piston rod
37 damper housing
38 length of the piston rod
39 fourth swivel axis
40 direction of rotation
41 scissor pair
42 connecting element
43 damping characteristic
44 comfort range
E plane
H height direction
B width direction
L longitudinal direction

What is claimed is:

1. A vehicle seat comprising:
an upper seat part and a lower seat part, the upper seat part and the lower seat part being connected by a scissor-action frame, and comprising a damper, the scissor-action frame comprising a first scissor arm and a second scissor arm, the first scissor arm and the second scissor arm being mounted so as to be rotatable about a common swivel axis, a first end of the damper being rotatably connected to the second scissor arm, wherein a first lever element and a second lever element are provided, a first end of the first lever element being rotatably connected to the first scissor arm, a first end of the second lever element being rotatably connected to the second scissor arm, and a second end of the damper being rotatably connected to a second end of the first lever element and to a second end of the second lever element.

2. The vehicle seat according to claim 1, wherein the first end of the first lever element is rotatably connected to the first scissor arm by means of a first swivel axis and the first end of the second lever element is connected to the second scissor arm by means of a second swivel axis and the second end of the first lever element, and the second end of the second lever element and the second end of the damper are connected by means of a third swivel axis.

3. The vehicle seat according to claim 2, wherein in a first state in which the vehicle seat is completely compressed, a first connection line between the first swivel axis and the third swivel axis and a second connection line between the second swivel axis and the third swivel axis form an acute angle.

4. The vehicle seat according to claim 2, wherein in a second state in which the vehicle seat is completely extended, a first connection line between the first swivel axis and the third swivel axis and a second connection line between the second swivel axis and the third swivel axis form an obtuse angle.

5. The vehicle seat according to claim 2, wherein the second lever element is U-shaped when viewed in at least one direction that is perpendicular to the first swivel axis and comprises a first leg and a second leg, the first leg being rotatably connected to the first scissor arm and the second leg being rotatably connected to the third swivel axis.

6. The vehicle seat according to claim 2, wherein the first lever element is shaped like a plate.

7. The vehicle seat according to claim 5, wherein the second end of the second lever element is arranged between the first leg and the second leg when viewed in the direction of longitudinal extension of the third swivel axis.

8. The vehicle seat according to claim 2, wherein the first scissor arm and the second scissor arm each comprise a floating bearing and a fixed bearing, the fixed bearing of the first scissor arm being connected to the upper seat part and the fixed bearing of the second scissor arm being connected to the lower seat part.

9. The vehicle seat according to claim 8, wherein a distance between the first swivel axis and the common swivel axis is smaller than a distance between the first swivel axis and the floating bearing of the first scissor arm, and a distance between the second swivel axis and the common swivel axis being smaller than a distance between the second swivel axis and the floating bearing of the second scissor arm.

10. The vehicle seat according to claim 1, wherein the vehicle seat also comprises a pneumatic spring for cushioning the vehicle seat, the pneumatic spring being connected to the scissor-action frame and to the upper seat part or the lower seat part.

11. A commercial vehicle, comprising a vehicle seat according to claim 1.

12. The vehicle seat according to claim 2, wherein in a second state in which the vehicle seat is completely extended, a first connection line between the first swivel axis and the third swivel axis and a second connection line between the second swivel axis and the third swivel axis form an obtuse angle, wherein the angle is larger than 170°.

13. The vehicle seat according to claim 2, wherein in a second state in which the vehicle seat is completely extended, a first connection line between the first swivel axis and the third swivel axis and a second connection line between the second swivel axis and the third swivel axis form an obtuse angle, wherein the angle is larger than 175°.

14. The vehicle seat according to claim 2, wherein in a second state in which the vehicle seat is completely extended, a first connection line between the first swivel axis and the third swivel axis and a second connection line between the second swivel axis and the third swivel axis form an obtuse angle, wherein the angle is 180°.

15. The vehicle seat according to claim 3, wherein the angle is smaller than 10°.

16. The vehicle seat according to claim 3, wherein the angle is smaller than 5°.

17. The vehicle seat according to claim 3, wherein the angle is smaller than 3°.

* * * * *